UNITED STATES PATENT OFFICE.

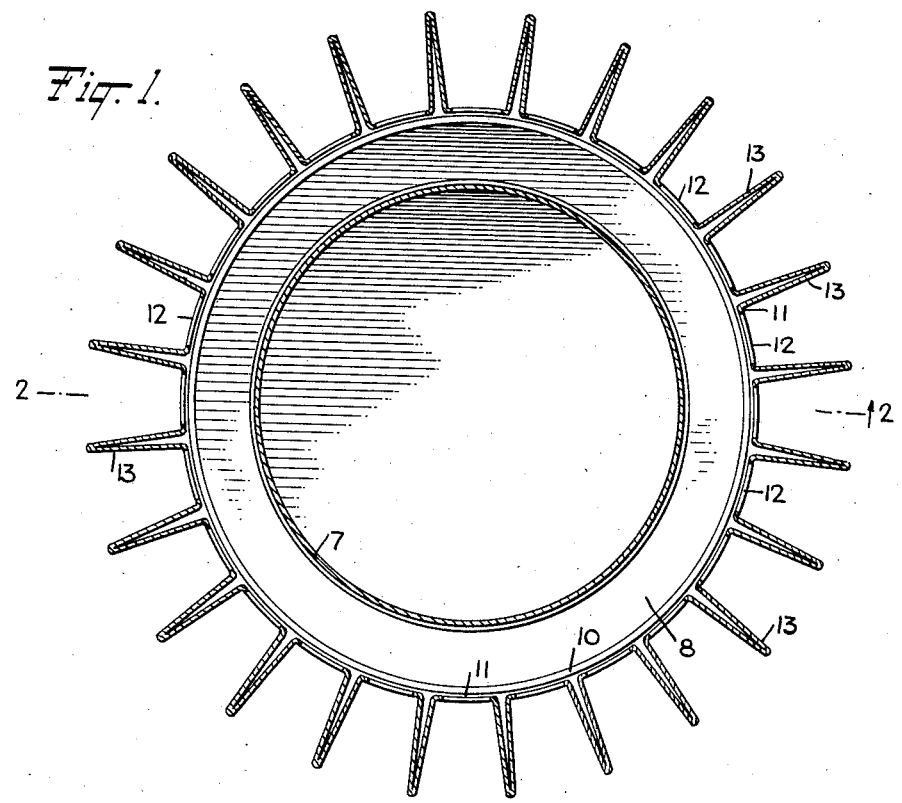
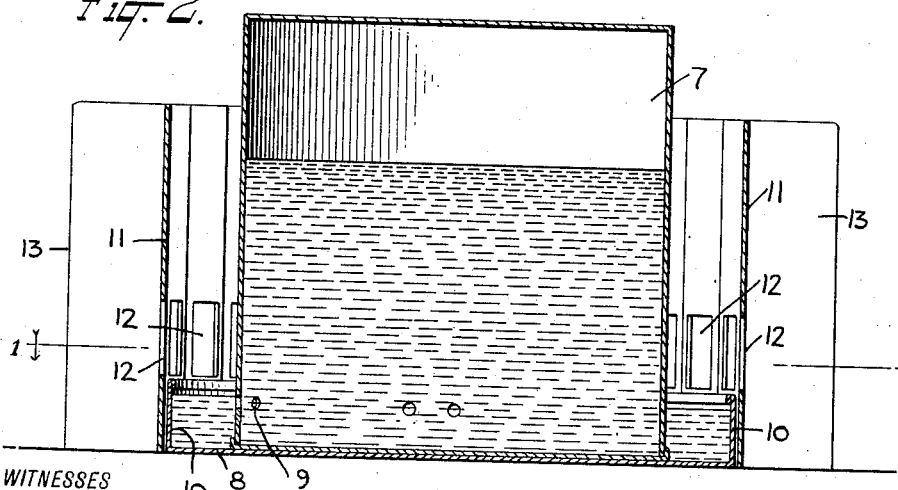

GEORGE WILLIAM GIBBENS, OF HADLEY, ILLINOIS.

DRINKING-FOUNTAIN FOR POULTRY.

1,050,732. Specification of Letters Patent. Patented Jan. 14, 1913.

Application filed June 1, 1912. Serial No. 700,928.

*To all whom it may concern:*

Be it known that I, GEORGE W. GIBBENS, a citizen of the United States, and a resident of Hadley, in the county of Pike and State of Illinois, have invented a new and Improved Drinking-Fountain for Poultry, of which the following is a full, clear, and exact description.

Among the principal objects which the present invention has in view are: to provide means for preventing chicks or other poultry from fouling or otherwise disturbing the drinking water; to prevent the huddling or crowding of poultry about the drinking fountain; and to provide a structure which is simple, efficient and compact, to facilitate the transportation of the same.

Reference is to be had to the accompanying drawings forming a part of this specification, in which similar characters of reference indicate corresponding parts in both views, and in which—

Figure 1 is a horizontal section taken on the line 1—1 in Fig. 2; and Fig. 2 is a vertical section taken on the line 2—2 in Fig. 1.

As seen in the accompanying drawings, the fountain is formed primarily of a receptacle 7, which, in its operative position, is inverted upon the bottom of a pan 8. The receptacle 7 is provided, adjacent the edge of the open end thereof, with orifices 9, these being provided in sufficient number to permit the flow of enough water from the receptacle 7 to the trough formed between the rim 10 of the pan 8 and the side of the receptacle 7. The barometric pressure within the receptacle 7 is such as to maintain a level of the water in the trough to cover the orifices 9. When, by reason of consumption of the water within the trough referred to, the level thereof is lowered to expose the orifices 9, a certain proportion of air finds its way through the orifices to the upper end of the receptacle 7, to reëstablish barometric columns, as shown in Fig. 2 of the drawings.

The method pursued when arranging the receptacle 7 and pan 8 to form the fountain, is to fill the receptacle 7, and to invert thereover the pan 8. Holding the receptacle and pan in this relation, the relative positions are reversed, the pan 8 being undermost, and the receptacle 7 supported thereon. The water immediately flows from the receptacle 7 into the trough formed adjacent the rim 10, until the barometric column is established.

To restrain the chicks from jumping into the trough referred to, I provide a guard, in the shape of a surrounding wall 11, in which are formed openings 12, through which the chicks insert their heads, to dip into the water in the trough. The openings 12 are not sufficiently large to pass the body of the chicks, which are thereby restrained from hopping upon the edge of the rim 10, or stepping into the trough formed between said rim and the side of the receptacle 7.

To prevent the crowding of the chicks while drinking, in which operation the weak birds are apt to be suffocated by pressure, or knocked down and trampled upon, I provide vertical separating wall sections 13. The sections 13 are formed as shown best in Fig. 1 of drawings, by returning the material of which they are composed, upon itself, letting the base of the angle thus formed spread slightly, to augment the structural strength.

In practice, I form the wall 11 and the wall sections 13 from the same piece of material, and the material preferred by me for this structure is galvanized iron of suitable thickness.

With the wall sections 13 arranged as shown in Fig. 1 of the drawings, a number of stalls radially disposed about the center of the fountain are formed. At the end of each stall is one of the openings 12. It is obvious that when the poultry cluster about the drinking fountain, any one chick being within one of the stalls prevents the intrusion of a second chick, and crowding of the birds about the fountain is prevented by the wall sections 13.

Having thus described my invention, I claim as new and desire to secure by Letters Patent:—

In combination; a drinking fountain of the character described; and an inclosure wall having a plurality of vertically-disposed folded wall sections outwardly extended to form a plurality of radially-disposed outwardly-opening stalls, said stalls having at the inner end thereof openings to permit the extension of the head and neck of chicks in position to drink from said fountain.

In testimony whereof I have signed my name to this specification in the presence of two subscribing witnesses.

GEORGE WILLIAM GIBBENS.

Witnesses:
J. B. ELY,
J. W. GIBSON.

Copies of this patent may be obtained for five cents each, by addressing the "Commissioner of Patents, Washington, D. C."